(12) United States Patent
Dalby et al.

(10) Patent No.: US 7,536,099 B2
(45) Date of Patent: May 19, 2009

(54) CAMERA PROTECTION COVER

(75) Inventors: Anthony Dalby, London (GB); Axel E. Meyer, Helsinki (FI)

(73) Assignee: Nokia Corporation, Espoo (FI)

( * ) Notice: Subject to any disclaimer, the term of this patent is extended or adjusted under 35 U.S.C. 154(b) by 287 days.

(21) Appl. No.: 11/442,632

(22) Filed: May 25, 2006

(65) Prior Publication Data

US 2007/0274710 A1 Nov. 29, 2007

(51) Int. Cl.
*G03B 17/02* (2006.01)

(52) U.S. Cl. ........................................ 396/535; 348/376

(58) Field of Classification Search ............. 455/556.2, 455/575.1, 575.3, 575.4, 575.8, 550.1; 396/448, 396/535, 536, 541; 348/376
See application file for complete search history.

(56) References Cited

U.S. PATENT DOCUMENTS

2002/0176714 A1* 11/2002 Nakanishi et al. ........... 396/448
2004/0180703 A1* 9/2004 Kim et al. ................ 455/575.1
2006/0056838 A1* 3/2006 Chen ........................... 396/448
2006/0105806 A1* 5/2006 Vance et al. ............. 455/556.1

FOREIGN PATENT DOCUMENTS

WO WO 2005/013585 2/2005
WO WO 2005/083990 9/2005

* cited by examiner

*Primary Examiner*—W. B. Perkey
*Assistant Examiner*—Fang-Chi Chang
(74) *Attorney, Agent, or Firm*—Alfred A. Fressola; Ware, Fressola, Van Der Sluys & Adolphson LLP

(57) ABSTRACT

A hand-portable electronic device 10 comprising: a first body part 11; a second body part 12 rotatably connected to the first body part, the second body part comprising a camera assembly 14 having an imaging axis 15 and an imaging window 16; and a slidable cover 13, the first and second body parts being rotatable with respect to each other about a rotation axis 17, the camera assembly being configured such that the imaging axis is orthogonal to the rotation axis, the slidable cover being adapted to slide between: i) a first position in which the first and second body parts are unlocked and are thereby able to rotate relative to one another; and ii) a second position in which the first and second body parts are locked by engagement of the slidable cover therebetween, relative rotation of the first and second body parts being thereby prevented, and in which the slidable cover covers the imaging window.

12 Claims, 3 Drawing Sheets

CAMERA PROTECTION COVER

FIELD OF THE INVENTION

The invention relates to camera-containing hand-portable electronic devices, and in particular to such devices incorporating features to protect the camera in the device.

BACKGROUND OF THE INVENTION

It is now common to find digital camera assemblies incorporated into many types of hand-portable electronic devices other than digital cameras. Such hand-portable electronic devices may encompass, for example, user-portable radio telephones (commonly known as mobile or cellular telephones), personal digital assistants (PDAs), portable video gaming devices, portable digital audio/video playback/recording devices or other devices incorporating one or more of the features of the aforementioned. Such hand-portable electronic devices tend to incorporate digital camera assemblies of increasing quality and functionality as various manufacturers compete with each other to provide improved facilities while maintaining portability of the device.

With increasing quality of camera assemblies comes an increased need for protection of the imaging window of the digital camera assembly. Typically, as the quality of the camera assembly increases, for example increasing with the number of pixels an imaging chip in the assembly is able to image, the requirement for larger and higher quality lenses increases. Larger lenses let more light into the camera assembly, and can thereby improve the image quality. To maintain the quality of the images, however, some kind of lens cover is preferred, in order to protect the camera assembly from scratches and other marks which can be an inevitable result of the typical use pattern of a hand portable electronic device such as a mobile telephone.

Additionally, when camera assemblies are incorporated into hand-portable electronic devices, there is now a preference for the camera assembly to be adjustable such that images can be taken of either the user or of a scene in front of the user while the user views the image via a screen on the device. An adjustable camera assembly may typically be within a rotatable body part of the hand-portable electronic device. An imaging axis of the camera assembly may thereby be rotated towards or away from the user as desired.

It is to be understood that the term "imaging axis" used herein is intended primarily to be defined as being an imaginary axis drawn through an axis of rotational symmetry of a lens within the camera assembly. An imaging axis of a camera assembly will thereby typically be in line with the approximate centre of the field of view of the camera assembly. The imaging axis may alternatively be defined as being an imaginary line drawn from the centre of the imaging window of the camera assembly to the centre of the field of view being imaged by the camera assembly.

One particular type of rotatable camera assembly found in a mobile telephone is described in WO 2005/083990, in which a hand-portable electronic device is disclosed having first and second body parts being rotatable relative to each other by means of a swivel hinge. The second body part comprises a digital camera input device, while the first body part comprises a screen for viewing images captured by the camera. Rotation of the second body part relative to the first body part allows the camera to be oriented in various directions relative to the screen.

A possible problem with such prior art hand-portable electronic devices incorporating a rotatable camera assembly is that inadvertent rotation of the camera assembly may occur when being carried, for example in a pocket or a handbag. Also, the imaging window or lens of the camera assembly may, when subjected to rough handling in transmit, be scratched or soiled, thus degrading the quality of the images captured by the camera assembly.

Slidable lens covers are known and possible in hand-portable electronic devices. Locking mechanisms for the prevention of inadvertent rotation of rotatable camera assemblies are also known. However, there is a general need to simplify the use and manufacture of such devices, using as few mechanical components as possible, so as to reduce the overall manufacturing cost. Combining more than one feature in a mechanical component of a hand-portable electronic device would go some way to fulfilling this need.

OBJECTS OF THE INVENTION

It is an object of the present invention to provide a hand-portable electronic device comprising a rotatable camera assembly with a mechanism for both protecting the imaging window or lens of the camera assembly and for locking the rotating mechanism of the device, thus protecting the hand-portable electronic device from the effects of handling and transmit in normal use.

It is a further object of the invention to provide a rotatable camera assembly in a hand-portable electronic device that can be provided with a protective cover and a rotation locking mechanism with a reduced number of mechanical parts.

SUMMARY OF THE INVENTION

According to the invention, there is provided a hand-portable electronic apparatus comprising: a first body part; a second body part rotatably connected to the first body part, the second body part comprising a camera assembly having an imaging axis and an imaging window; and a slidable cover, the first and second body parts being rotatable with respect to each other about a rotation axis, the apparatus arranged such that the slidable cover is able to slide between:

i) a first position, in which the first and second body parts are unlocked and are thereby able to rotate about the rotation axis relative to one another; and ii) a second position, in which the first and second body parts are locked by engagement of the slidable cover therebetween, relative rotation of the first and second body parts being thereby prevented, and in which the slidable cover substantially covers the imaging window.

Corresponding means for performing one or more of the functions described herein are within the present disclosure.

BRIEF DESCRIPTION OF THE DRAWINGS

Embodiments of the present invention will now be described by way of example and with reference to the accompanying drawings in which.

Figure 1:
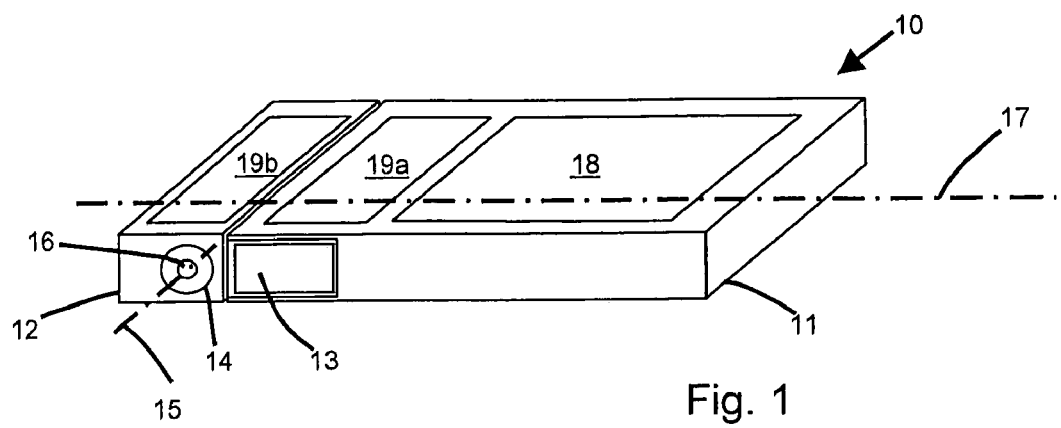
FIG. 1 illustrates a schematic isometric view of a hand-portable electronic device in a closed configuration.

A hand-portable electronic device according to an embodiment of the invention is illustrated in FIG. 1. The hand-portable electronic device 10, shown in a closed configuration, comprises a first body part 11 and a second body part 12. The first body part 11 may comprise a screen 18 and a first user input area 19a. The second body part 12 may comprise a second user input area 19b and a camera assembly 14. The camera assembly 14 further comprises a lens or imaging window 16.

The screen 18 of the hand-portable electronic device may be used to view images captured from the camera assembly 14. The user input areas 19a, 19b may comprise touch sensitive areas such as alphanumeric input keys and/or a touch sensitive writing area. The screen 18 may also serve as a touch sensitive user input area. The hand-portable electronic device may also comprise one or more other input or output features or areas.

The first body part 11 and second body part 12 are rotatably connected to each other via an internal rotatable hinge (not shown), which enables the parts 11, 12 to rotate relative to each other about a rotation axis 17. The camera assembly 14 comprised within the second body part 12 may optionally be configured such that an imaging axis 15 is oriented orthogonally to the rotation axis 17. Whichever way the imaging axis 15 is directed as the second body part 12 rotates relative to the first body part 11, the imaging axis 15 then remains orthogonal to the rotation axis 17.

Figure 2:
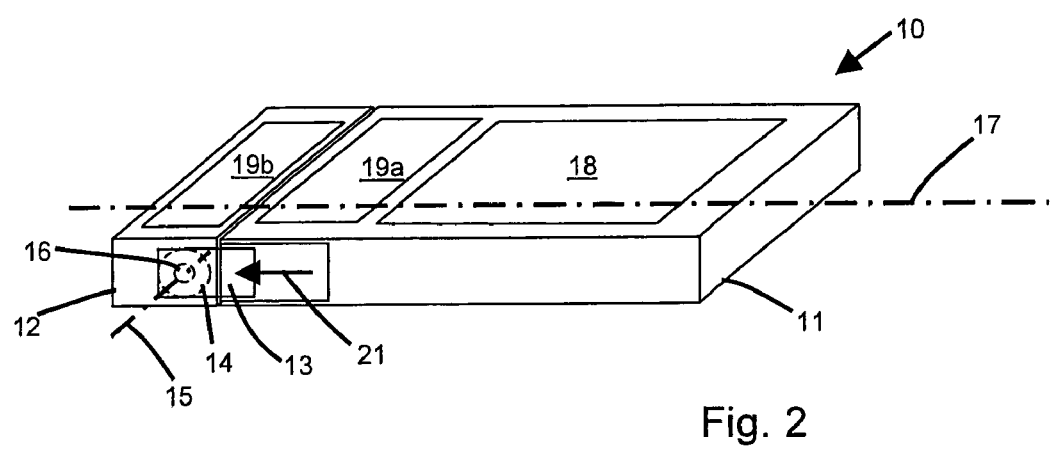
FIG. 2 illustrates a schematic isometric view of the hand-portable electronic device of FIG. 1 in which a slidable cover is shown covering an imaging window of a camera assembly.

In FIG. 1 a slidable cover 13 is shown comprised in the first body part 11, the slidable cover 13 being in a first position in which the first and second body parts 11, 12 are able to rotate relative to each other. This slidable cover 13 is shown in FIG. 2 in a second position in which the slidable cover 13 has been moved from its first position to cover the imaging window or lens 16 of the camera assembly 14, thus crossing the imaging axis 15 in the process. In the second position, the slidable cover 13 serves both to cover the imaging window 16 and to lock the first and second body parts 11, 12 to each other. The first and second body parts 11, 12 are thereby prevented from rotating relative to each other. This arrangement has the advantage of protecting the camera assembly 14 from damage or soiling during handling when the hand-portable electronic device is in the closed configuration of FIGS. 1 and 2.

The slidable cover 13 is typically incorporated in the first body part 11. Sliding the slidable cover 13 from the aforementioned first position in which the slidable cover 13 is disengaged from the second body part 12 to the second position engages the first and second body parts 11, 12 and thereby prevents relative rotation of the first and second body parts 11, 12.

Alternatively, in certain embodiments the slidable cover 13 may be incorporated in the second body part 12 when the device is in the open configuration. In these alternative embodiments, the slidable cover 13 may be adapted to retract from engagement with the first body part 11 into the second body part 12 to allow for relative rotation of the first and second body parts. The slidable cover 13 in the retracted position would therefore be located on the opposite side of the imaging window 16.

FIG. 2 shows the hand-portable electronic device 10 of FIG. 1 with the slidable cover 13 in the second position, having been moved from the first position of FIG. 1 in the direction indicated by arrow 21. The slidable cover 13 is shown covering the imaging window 16 of the camera assembly 14. Due to the slidable cover 13 still being engaged with the first body portion, the first and second body parts 11, 12 are thereby locked together as regards relative rotation about the rotation axis 17. Engagement between the slidable cover 13 and the first and second body parts 11, 12 may be achieved by means of a releasable catch or detent for maintaining the slidable cover 13 in the second position. A further releasable catch or detent may be provided to maintain the slidable cover 13 in the first position. Such releasable catches or detents may be releasable by various user actions such as a sliding action or a combination of pressing and sliding actions. For example, releasing the slidable cover 13 from the first position and moving it towards the second position may be achieved by first a pressing action followed by a sliding action on the slidable cover 13. The slidable cover may be provided with a resilient means to effect a spring-loading mechanism that returns the slidable cover to the first position when released from the second position. The slidable cover 13 may further be spring loaded to maintain the slidable cover 13 in the first position.

Figure 3:
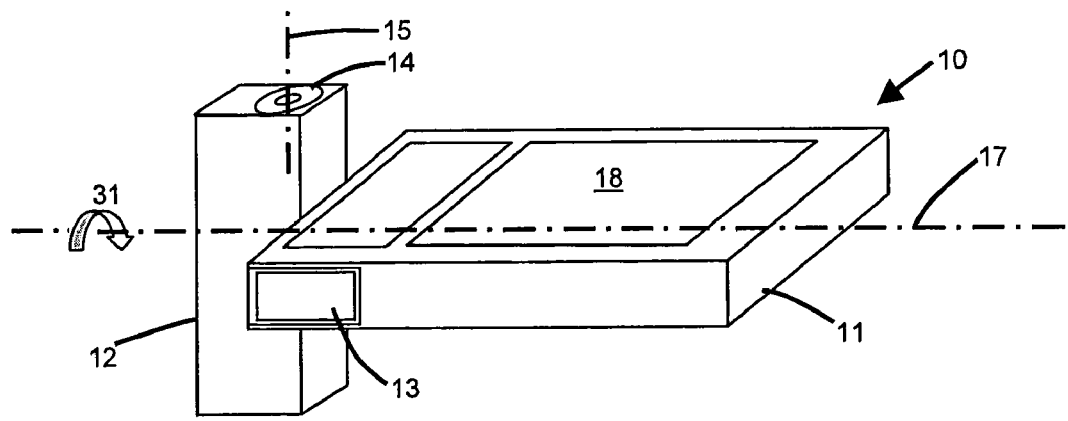
FIG. 3 illustrates a schematic isometric view of the hand-portable electronic device of FIG. 1 in a first open configuration.

With the slidable cover 13 in the first position, the second body part 12 may be rotated about the rotation axis 17 from the closed configuration of FIG. 1 to an open configuration, as for example that shown in FIG. 3. The direction of rotation is indicated by arrow 31. In FIG. 3, the second body part 12 is rotated relative to the first body part 11, thus rotating the imaging axis 15 but maintaining the imaging axis 15 orthogonal to the rotation axis 17.

Figure 4:
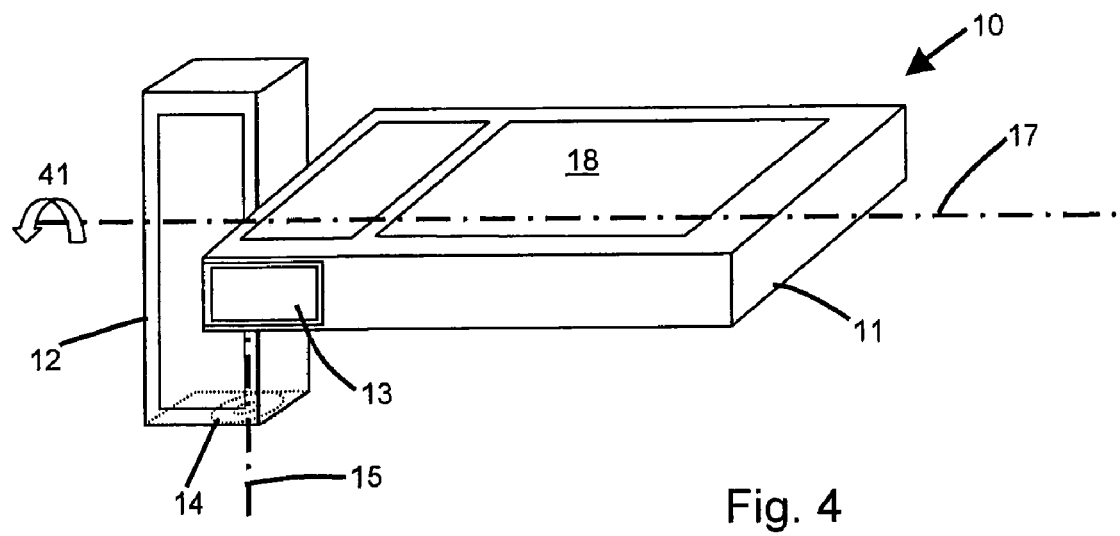
FIG. 4 illustrates a schematic isometric view of the hand-portable electronic device of FIG. 1 in a second open configuration.

The second body part 12 may alternatively be rotated in the opposite direction, as indicated by arrow 41 in FIG. 4. Whereas FIG. 3 illustrates a configuration in which the user may both view the screen 18 and capture a self-portrait image from the camera assembly 14, FIG. 4 shows an arrangement where the user can view on the screen 18 an image taken by the camera assembly 14 in front of the user.

Figure 5:
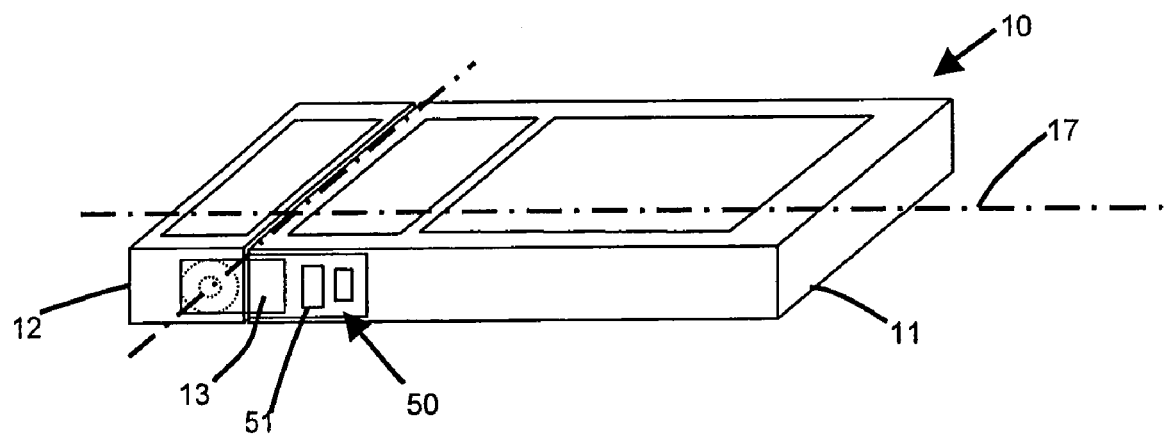
FIG. 5 illustrates a schematic isometric view of a hand-portable electronic device comprising interfaces for data transfer between the hand-portable electronic device and an external device.

A further embodiment of the hand-portable electronic device 10 of the invention is shown in FIG. 5. In this, the hand-portable electronic device 10 is in a closed configuration, with the slidable cover 13 in the aforementioned second position. One or more interfaces 50 may be provided in the first body part 11. One of these interfaces 50 may, for example, comprise a socket 51 for data transfer between the hand-portable electronic device and an external device. The socket 51 may, for example, be a (e.g. mini) USB (Universal Serial Bus) socket. With the slidable cover 13 in the second position, the one or more interfaces 50 are revealed, thus allowing the user to, for example, transfer images taken with the camera assembly 14 to an external device such as a personal computer. When the camera assembly is in use, the interfaces 50 are not needed or are disabled, and so are hidden beneath the slidable cover 13 when in the first position.

Figure 6:
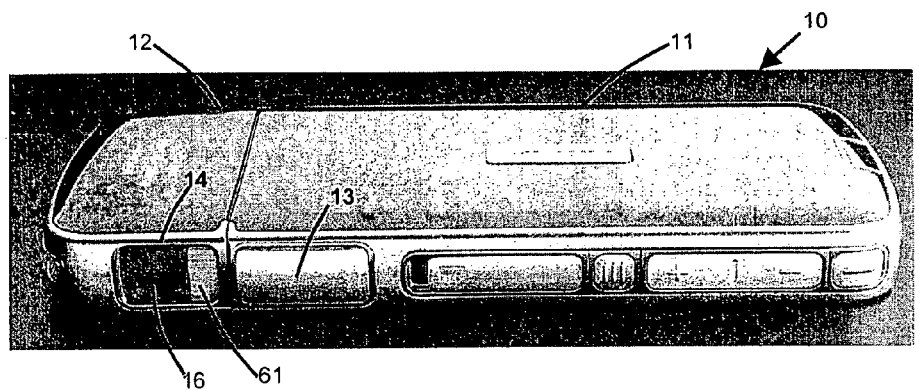
FIG. 6 illustrates a perspective view of a hand-portable electronic device according to an embodiment of the invention.

FIG. 6 illustrates an exemplary embodiment of a hand-portable electronic device 10 of the invention. The slidable cover 13 comprised within the first body part 11 is adapted to be moved from the position shown to one in which the slidable cover 13 covers the imaging window 16 of the camera assembly 14 comprised within the second body part 12. The hand-portable electronic device of the embodiment shown further comprises a flash module 61 adjacent the camera assembly 14. The flash module may in this case also be covered and thereby protected by moving the slidable cover 13 from the first position to the second position.

Figure 7:
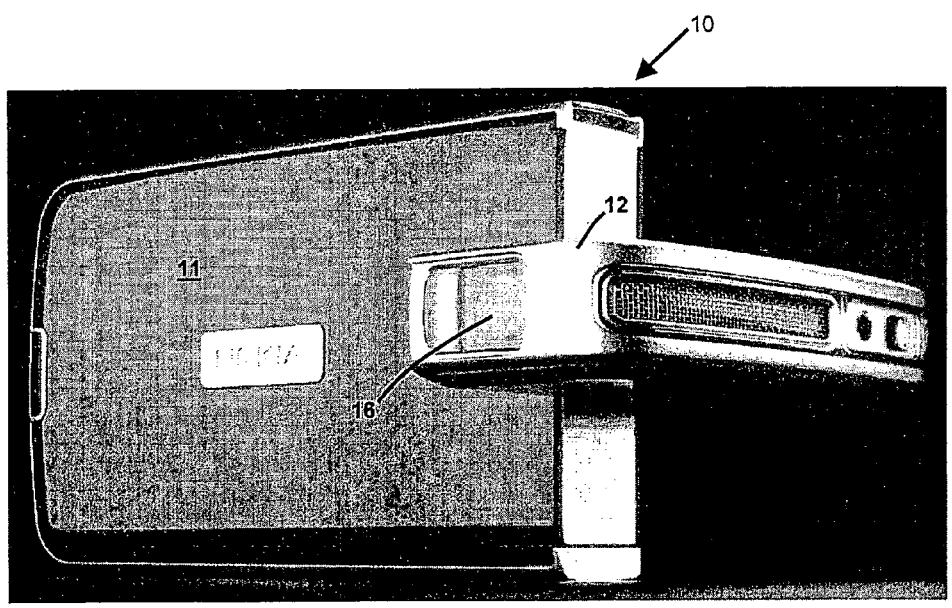
FIG. 7 illustrates a perspective view of the hand-portable electronic device of FIG. 6 when in an open configuration.

FIG. 7 shows the hand-portable electronic device 10 of FIG. 6 when in an open configuration, with the imaging window 16 facing away from the screen (18, FIGS. 1-5). In this open configuration the second body part 12 is rotated approximately 90 degrees relative to the first body part 11.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A hand-portable electronic apparatus comprising:
a first body part comprising one or more interfaces;
a second body part rotatably connected to the first body part, the second body part comprising a camera assembly having an imaging axis and an imaging window; and
a slidable cover,
the first and second body parts being rotatable with respect to each other about a rotation axis,
the apparatus being configured such that the slidable cover is able to slide between:
i) a first unlocked position, in which the first and second body parts are unlocked and are thereby able to rotate about the rotation axis relative to one another, wherein the slidable cover is disposed only within the first body part when in the first unlocked position; and
ii) a second locked position, in which the first and second body parts are locked by engagement of the slidable cover therebetween, relative rotation of the first and second body parts being thereby prevented, and in which the slidable cover substantially covers the imaging window;
and wherein the apparatus is configured such that the slidable cover covers the one or more interfaces when in the first unlocked position and reveals the one or more interfaces when in the second locked position.

2. The hand-portable electronic apparatus of claim 1 wherein the camera assembly is configured such that the imaging axis is orthogonal to the rotation axis.

3. The hand-portable electronic apparatus of claim 1 wherein the slidable cover is adapted to slide in a direction parallel to the rotation axis.

4. The hand-portable electronic apparatus of claim 1 wherein the slidable cover is adapted to engage with the second body part when the electronic apparatus is in a closed configuration.

5. The hand-portable electronic apparatus of claim 4 wherein the one or more interfaces comprise a socket for data transfer between the hand-portable electronic apparatus and an external apparatus.

6. The hand-portable electronic apparatus of claim 1, the second body part further comprising a flash module, wherein the slidable cover is adapted to substantially cover the flash module when the slidable cover is in the second locked position.

7. The hand-portable electronic apparatus of claim 1, wherein the apparatus is a device.

8. The hand-portable electronic apparatus of claim 1, wherein the apparatus is a device module.

9. A hand-portable electronic apparatus comprising:
a first means for housing comprising one or more means for interfacing;
a second means for housing rotatably connected to the first means for housing, the second means for housing comprising a means for capturing images having an imaging axis and a means for receiving the image; and
a means for slidably covering,
the first and second means for housing being rotatable with respect to each other about a rotation axis,
the apparatus being configured such that the means for slidably covering is able to slide between:
i) a first unlocked position, in which the first and second means for housing are unlocked and are thereby able to rotate about the rotation axis relative to one another, wherein the means for slidably covering is disposed only within the first means for housing when in the first unlocked position; and
ii) a second locked position, in which the first and second means for housing are locked by engagement of the means for slidably covering therebetween, relative rotation of the first and second means for housing being thereby prevented, and in which the means for slidably covering substantially covers the means for receiving the image;
and wherein the apparatus is configured such that the means for slidably covering covers the one or more means for interfacing when in the first unlocked position and reveals the one or more means for interfacing when in the second locked position.

10. The hand-portable electronic apparatus of claim 9, wherein the means for capturing images is configured such that the imaging axis is orthogonal to the rotation axis.

11. The hand-portable electronic apparatus of claim 9, wherein the means for slidably covering is adapted to slide in a direction parallel to the rotation axis.

12. A method of assembling a hand-portable electronic apparatus, the hand-portable electronic apparatus comprising:
a first body part comprising one or more interfaces;

a second body part rotatably connected to the first body part, the second body part comprising a camera assembly having an imaging axis and an imaging window; and a slidable cover, the first and second body parts being rotatable with respect to each other about a rotation axis, the apparatus configured such that the slidable cover is able to slide between:

i) a first unlocked position, in which the first and second body parts are unlocked and are thereby able to rotate about the rotation axis relative to one another wherein the slidable cover is disposed only within the first body part when in the first unlocked position; and ii) a second locked position, in which the first and second body parts are locked by engagement of the slidable cover therebetween, relative rotation of the first and second body parts being thereby prevented, and in which the slidable cover substantially covers the imaging window, the method comprising assembling together the first/second body parts and the slideable cover such that the slidable cover is able to slide between:

i) a first unlocked position, in which the first and second body parts are unlocked and are thereby able to rotate about the rotation axis relative to one another, wherein the slidable cover is disposed only within the first body part when in the first unlocked position; and ii) a second locked position, in which the first and second body parts are locked by engagement of the slidable cover therebetween, relative rotation of the first and second body parts being thereby prevented, and in which the slidable cover substantially covers the imaging window, and wherein the apparatus is configured such that the slidable cover covers the one or more interfaces when in the first unlocked position and to reveal the one or more interfaces when in the second locked position.

* * * * *